United States Patent [19]

Ohba et al.

[11] Patent Number: 5,546,170
[45] Date of Patent: Aug. 13, 1996

[54] PRINTER WITH PRINT DENSITY SWITCHING MEANS

[75] Inventors: Hiroki Ohba, Fuchu; Yoshihiro Tonomoto, Kawasaki; Kiyohisa Yanagita, Kawasaki; Yoji Houki, Kawasaki; Tomokazu Akuta, Kawasaki; Akihiro Komuro, Kawasaki, all of Japan

[73] Assignee: Fujitsu Limited, Kawasaki, Japan

[21] Appl. No.: 262,872

[22] Filed: Jun. 21, 1994

Related U.S. Application Data

[62] Division of Ser. No. 956,868, Oct. 2, 1992, Pat. No. 5,355,200.

[30] Foreign Application Priority Data

Oct. 3, 1991 [JP] Japan .................... 3-256291

[51] Int. Cl.$^6$ ............................................. G03G 15/06
[52] U.S. Cl. ................................... 355/246; 355/214
[58] Field of Search ............................... 355/208, 214, 355/246

[56] References Cited

U.S. PATENT DOCUMENTS

| | | | |
|---|---|---|---|
| 4,448,515 | 5/1984 | Ishikawa | 355/313 |
| 4,522,481 | 6/1985 | Imai et al. | 355/246 |
| 4,962,394 | 10/1990 | Sohmiya et al. | 346/154 |
| 5,124,751 | 6/1992 | Fukui et al. | 355/246 |
| 5,162,849 | 11/1992 | Yoshino et al. | 355/246 X |

FOREIGN PATENT DOCUMENTS

| | | |
|---|---|---|
| 0432476A2 | 6/1991 | European Pat. Off. . |
| 61-025161 | 2/1986 | Japan . |
| 62-106481 | 5/1987 | Japan . |

OTHER PUBLICATIONS

Siemens AG "HighPrint 6001" and HighPrint 6002–Operating instructions, 1989, Bereich Kommuikationsenderäte, Munich, DE, pp. 1–2 and 4–5.
Patent Abstracts of Japan, vol. 12, No. 319, p. 751, Aug. 30, 1988, & JP–A–63 085 661 (Toshiba), Apr. 16/ 1988 *abstract*.
Patent Abstracts of Japan, vol. 14, No. 8 (P–987) Jan. 10, 1990 & JP–A–01 257 978 (Ricoh) Oct. 16, 1989 *abstract*.

*Primary Examiner*—Fred L. Braun
*Attorney, Agent, or Firm*—Staas & Halsey

[57] ABSTRACT

A computer controlled printer is capable of printing at different print densities. This makes it possible to automatically determine an optimum print density according to a normal operational mode with serious consideration given to print quality and an economy operational mode with serious consideration given to operating costs, thereby decreasing the print consumables. The printer has a print mechanism section for printing papers according to print data and a print controlling section for controlling the print mechanism section. The print controlling section selects either a print density in a normal mode or a print density in an economy mode according to the normal/economy instructions and controls the print density of the print mechanism section correspondingly.

10 Claims, 14 Drawing Sheets

OD SENSOR (SHARP; GP2S01)

PENETRATION SENSOR (TDK; TS0512LB-20)

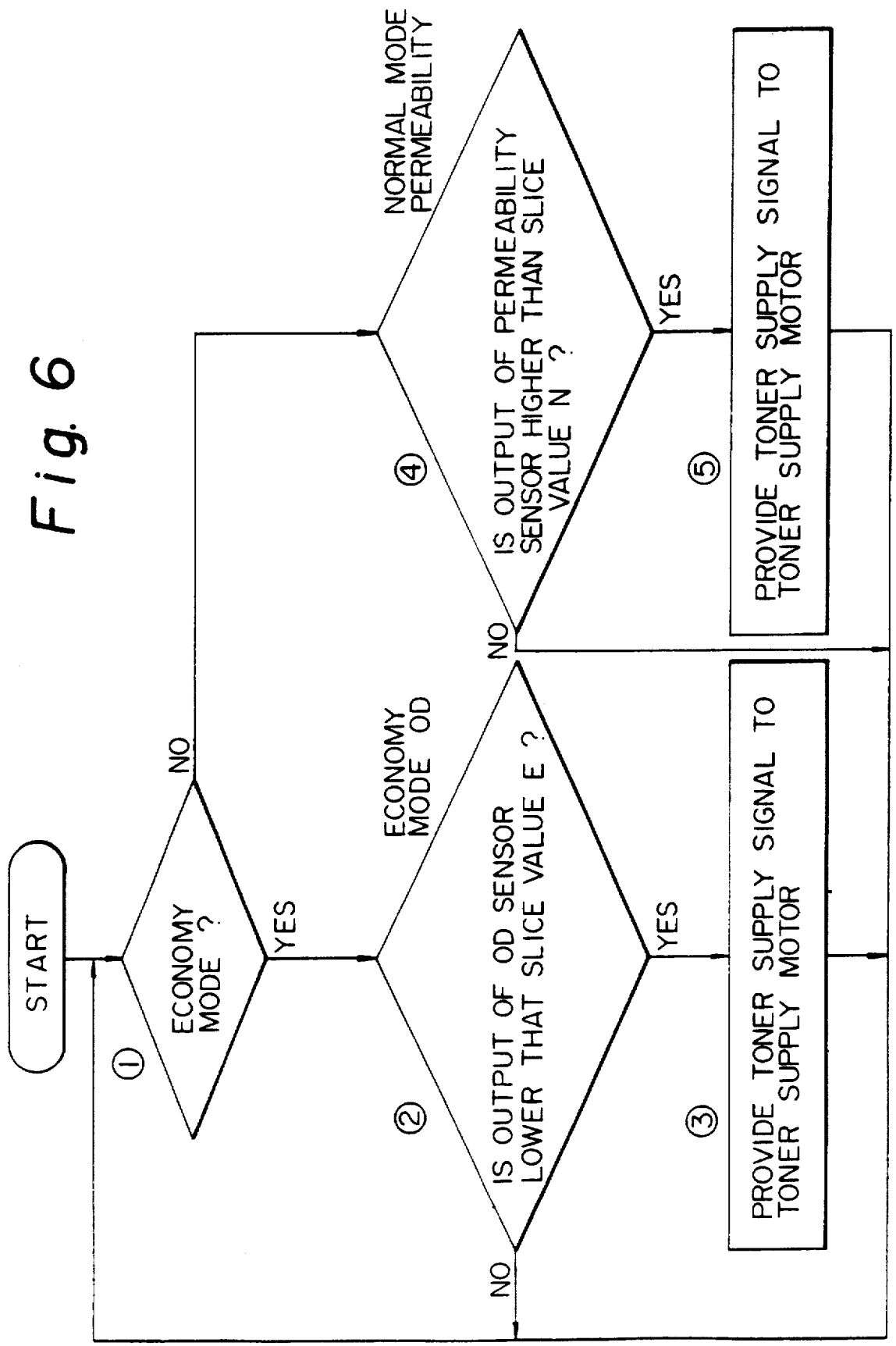

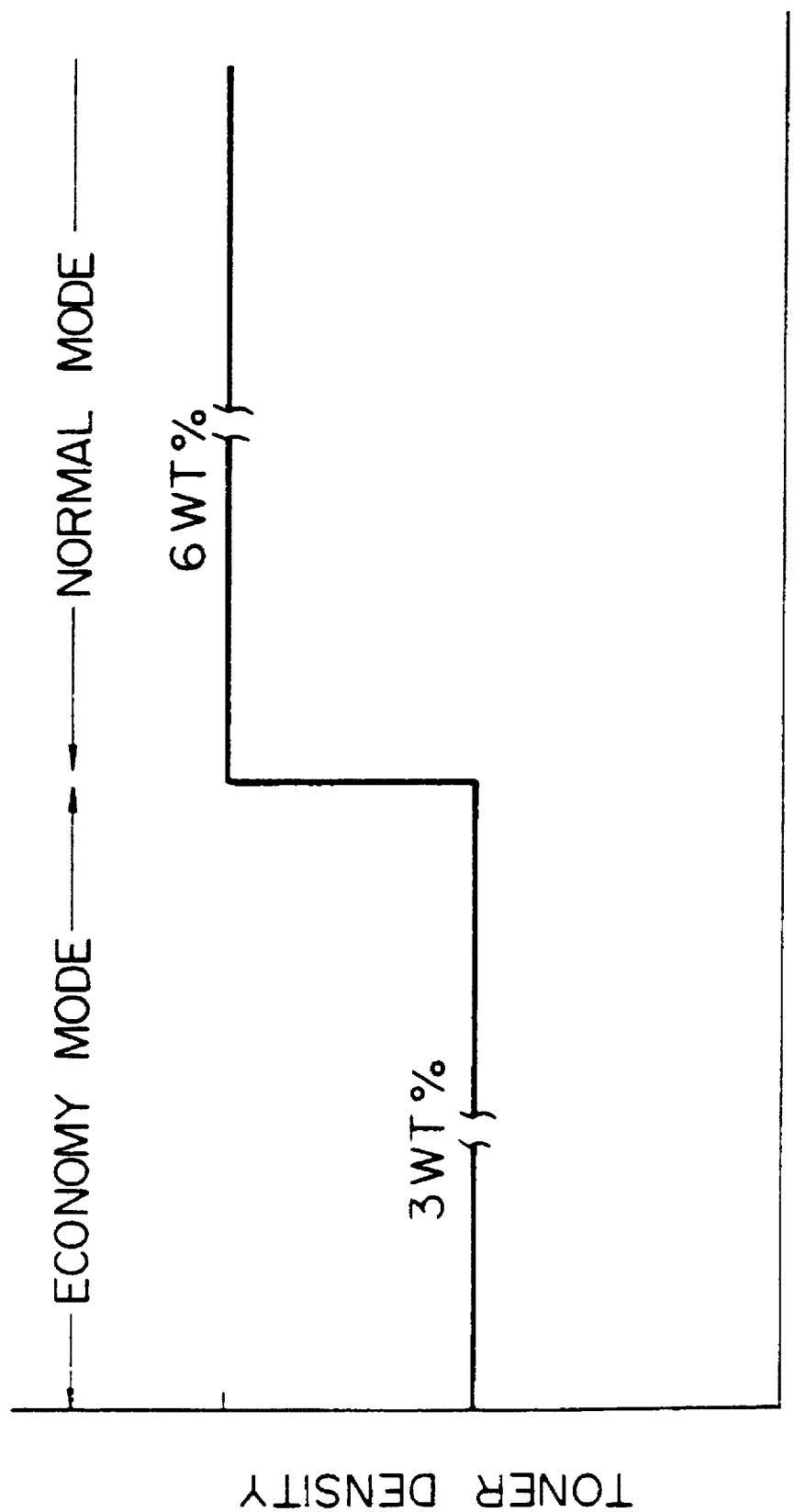

Fig. 7(B)

| | NORMAL MODE | ECONOMY MODE |
|---|---|---|
| 20mm SQUAR, FULL DENSITY (OD VALUE) | 1.25 OR MORE | 1.00 ~ 1.10 |
| LINE DENSITY (OD VALUE) | 1.30 OR MORE | 1.20 OR MORE |
| TONER CONSUMPTION (g/10000 PAGES) | 340 | 240 |
| | POSSIBLE | POSSIBLE |
| READABLE | | |

NOTE: TONER CONSUMPTION UNDER CONDITIONS OF 10000 PAGES A4 SIZE; RATE OF PRINT ; 4%

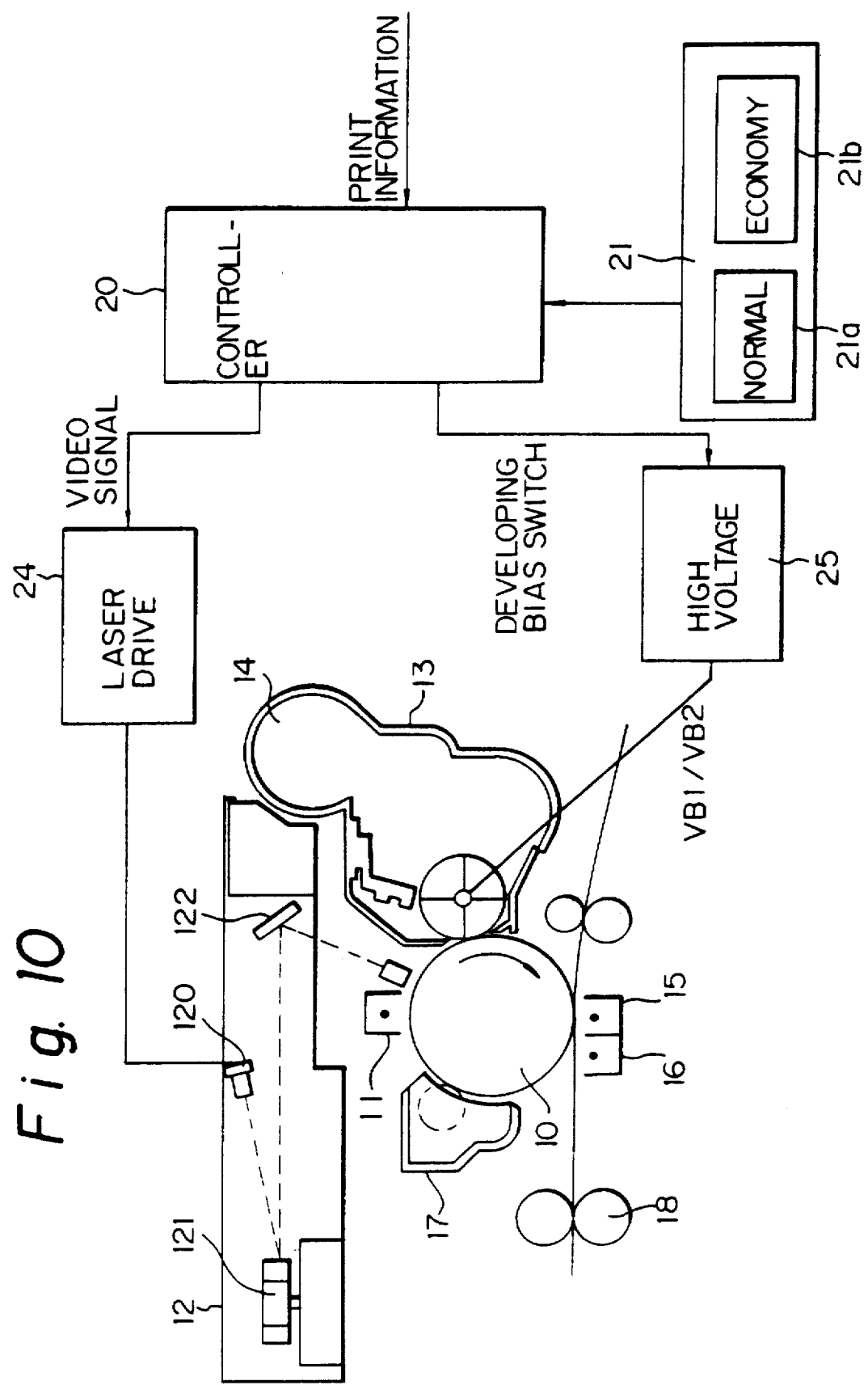

PRINTER WITH PRINT DENSITY SWITCHING MEANS

This application is a division, of application Ser. No. 07/956,868, filed Oct. 2, 1992, now U.S. Pat. No. 5,355,200.

BACKGROUND OF THE INVENTION

1. Field of the Invention

The present invention relates to a printer capable of switching over the print concentration.

Such printers as electronic photograph printers, heat transfer printers, ink jet printers, etc. are widely utilized with an output unit of a computer, etc. a copier, a facsimile and so forth.

The toner, heat transfer ink ribbons, ink cartridges, etc. in the printers are consumables, and are replaced by users.

Because of the expansion of the utilization frequency of printers in recent years, there is now a demand for reducing the volume of the toners and other consumables used in order to reduce the cost (operating costs) of said consumables.

2. Description of the Related Art

A print density adjusting/designating means is installed in an electronic photograph printer, etc. so that an operator may adjust said designating means to a desired print density and adjust the print density.

If the print density is set at a low level by this print density adjusting means, the toner volume is reduced, while if the print density is set at a high level, the toner volume is increased.

This print density adjusting function is installed so as to perform a printing operation at an optimum density without adjusting the volume of toner and the like used, though the toner volume can be adjusted if necessary.

In general, the documents etc. to be printed are sometimes required to be printed in thick black ink with serious consideration given to print quality, while documents for manuscripts are sometimes readable even though the print density is thin.

For this reason, it is preferable to perform a printing operation with serious consideration given to the print quality and a printing operation with serious consideration given to the reduction of the volume of print consumables used, which involves the following problems in the prior art.

(1) The conventional print density adjusting function is inherently a fine adjustment taking into serious consideration the print quality, and has difficulty in adjusting the print to a readable print density.

(2) Because an operator's individual preference is reflected on the adjustment as the print density is adjusted by the operator, reduction of the print consumables is not very significant.

(3) Adjustment care must be taken because the operator needs to make a fine adjustment whenever so required.

SUMMARY OF THE INVENTION

Therefore, it is an object of this invention to propose a printer capable of automatically determining the optimum print density according to a normal mode with emphasis placed on print quality and to an economy mode with emphasis placed on operating costs, and thus decreasing the print consumables.

Another object of present invention is to propose a printer capable of automatically determining the optimum print density according to a normal mode with emphasis placed on print quality and an economy mode with emphasis placed on operating costs, and thus decreasing the toner volume.

According to the present invention, these is provided a printer having a print mechanism for a printing operation according to the print data and a print controlling section for controlling said print mechanism section, characterized in that said print controlling section selects either the print density in normal mode or the print density in economy mode according to the normal/economy instructions and controls the print density of said print mechanism section to the selected print density.

Because a print controlling section selects either the print density in normal mode or the print density in economy mode according to the normal/economy instructions and controls the print density, which selected the print density of the print mechanism section, this invention can make a print sufficient in print quality in the normal mode and can make a readable print in the economy mode and moreover can automatically decrease the consumption volume of print consumables. In addition, because the print density can be controlled automatically to a readable degree in the economy mode instruction, the operator's attention becomes unnecessary and the print operation can be controlled to an adequate print density and sufficient consumption volume reducing effect of consumables can be obtained.

One aspect of this invention is characterized by installing an instruction means for providing said normal/economy instructions.

Because an instruction means for performing the normal/economy instructions is installed, the operator can realize the aforesaid mode of operation only by controlling the instruction means.

Another aspect of this invention is characterized in that said print mechanism section is structured with a print mechanism for forming a latent image by latent image forming sections and onto an image carrier and for developing said latent image by a developing device having a toner replenishing section and that said print controlling section controls the toner density of said developing device for controlling same to said print density that is selected.

Because the print mechanism is structured with a print mechanism for forming latent image in latent image forming sections and onto an image carrier and for developing it in developing device having a toner replenishing section, wherein a print controlling section controls the toner density of the developing device for controlling the selected print density, the optimum print quality can be easily realized by controlling the toner density.

Still another aspect of this invention is characterized by installing a toner density detector for detecting said toner density and accommodating the designated toner density in normal mode and the designated toner density in economy mode into said print controlling section and by controlling the toner replenishing section of said developing device by comparing the designated toner density in said normal mode with the detection output of said toner density detector when the normal mode is instructed and for controlling the toner replenishing section of said developing device by comparing the designated toner density in said economy mode with the detection output of said toner density detector when the economy mode is instructed.

Because this invention accommodates a designated toner density in normal mode and a designated toner density in economy mode into a print controlling section and controls a toner replenishing section of the developing device through a comparison of the designated toner density in normal mode with the detection output of toner density detector when the normal mode is instructed and controls the toner replenishing section 14 of the developing device through a comparison of the designated toner density in economy mode with the detection output of said toner density detector when the economy mode is instructed, a toner savings can be realized by an easier toner density control.

An embodiment of this invention is characterized by having first and second toner density detectors and different in toner density-to-output linear characteristics as said toner density detector, where said print controlling section takes in the output of said first toner density detector when said normal mode is instructed and takes in the output of said second toner density detector when said economy mode is instructed.

Because this embodiment installs first and second toner density detectors and is different in the toner density-to-output linear characteristics as a toner density detector and uses selectively the normal/economy modes, a favorable toner density control becomes available even if the toner density difference should be set to a large value against the normal mode and the economy mode.

Another embodiment of this invention is characterized in that said image carrier is structured of a photo sensitive body and said latent image forming sections are comprised of a charging device for charging electricity to said photo sensitive body and a light image writing section, wherein said print controlling section controls the light intensity of said light image writing section for controlling it to the said print density that is selected.

Because this embodiment structures an image carrier with a photo sensitive body and structures latent image forming sections with a charging device for charging electricity to the photo sensitive body and with a light image writing section so that a print controlling section can control the light intensity of light image writing section for-controlling it to the selected print density, the toner volume can be decreased by controlling the light intensity. This principle can also be applied to the toner of one constituent.

Still another embodiment of this invention is characterized by installing a voltage impressing section for impressing a development bias voltage to said developing device, wherein said print controlling section controls the development bias voltage of said voltage impressing section to control it to the said print density that is selected.

Because this embodiment installs a voltage impressing section for impressing a development bias voltage to a developing device wherein a print controlling section controls the development bias voltage of the voltage impressing section for controlling it to the selected print density, the toner volume can be decreased by controlling the development bias voltage. This principle can also be applied to the toner of one constituent.

A further embodiment of this invention is a printer having a print mechanism section for performing a printing operation by adhering the coloring materials to a recording medium according to the print data and a print controlling section for controlling said print mechanism section, characterized in that said print controlling section changes the adhesion volume of coloring materials in said print mechanism section according to the normal/economy instructions.

According to this embodiment, because a print controlling section selects either the print density in normal mode or the print density in economy mode according to the normal/economy instructions and controls the print density that selected the print density of print mechanism section, this invention can make a print sufficient in print quality in the normal mode and can make a readable print in the economy mode and moreover can automatically decrease the consumption volume of print consumables. In addition, because the print density can be controlled automatically to a readable degree in the economy mode instruction, the operator's attention becomes unnecessary and the print work can be controlled to an adequate print density and sufficient consumption volume reducing effect of consumables can be obtained.

BRIEF DESCRIPTION OF THE DRAWINGS

FIG. 6 is a process flow chart of a second embodiment of this invention;

FIGS. 7(A) and (B) are operation explanatory drawings of a second embodiment of this invention;

FIG. 10 is a block flow diagram of a fourth embodiment of this invention;

DESCRIPTION OF THE PREFERRED EMBODIMENTS

The preferred embodiments will now be described with reference to the accompanying drawings.

Figure 1:
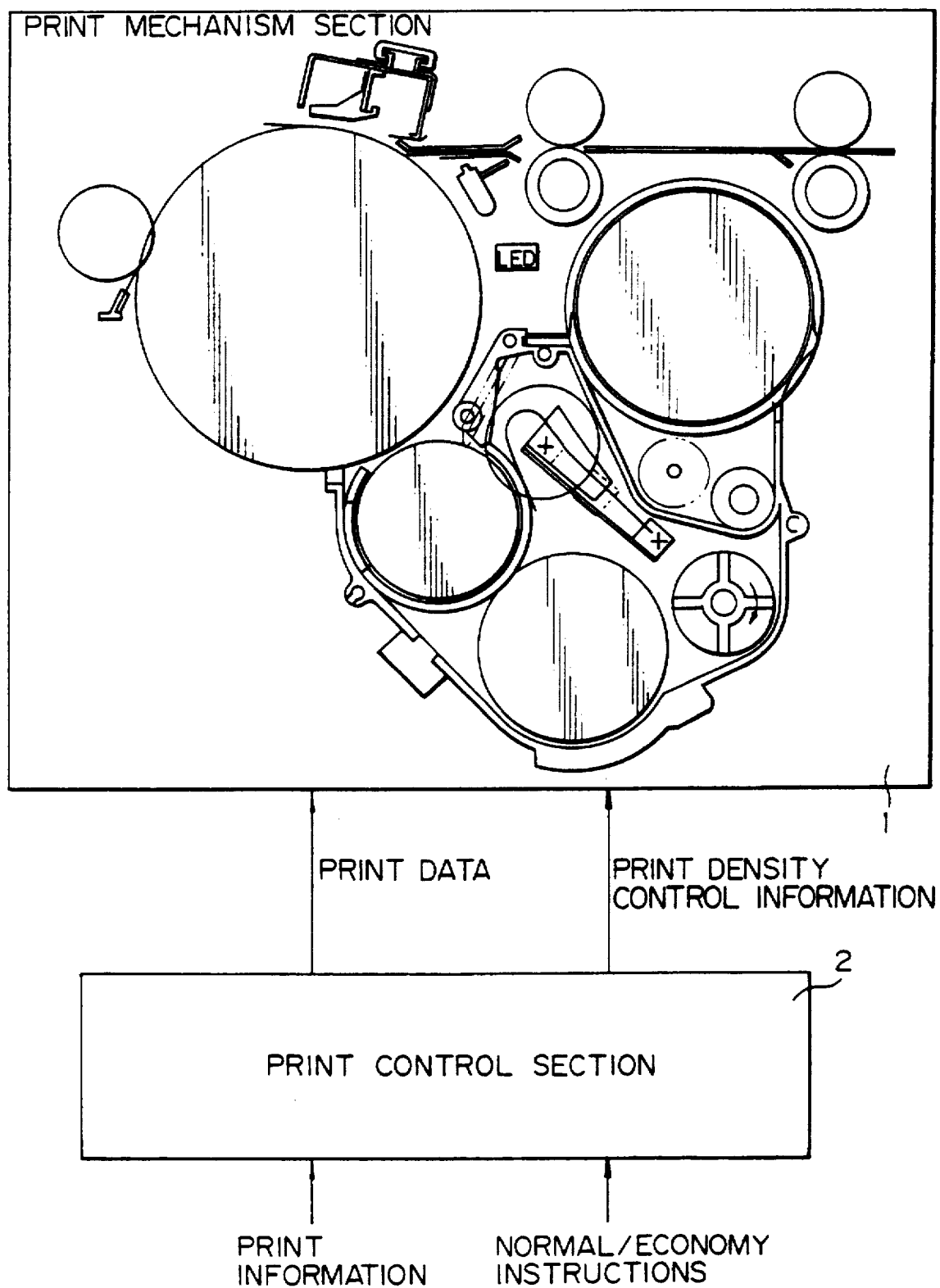
FIG. 1 is a principle diagram of this invention.

FIG. 1 is a principle diagram of this invention. In this printer, there are a print mechanism section 1 and a print control section 2. The print control section 2 selects either the print density in normal mode or the print density in economy mode according to the normal/economy instructions to control the print density of the print mechanism section 1 to the selected print density.

(a) Description of First Embodiment

Figure 2:
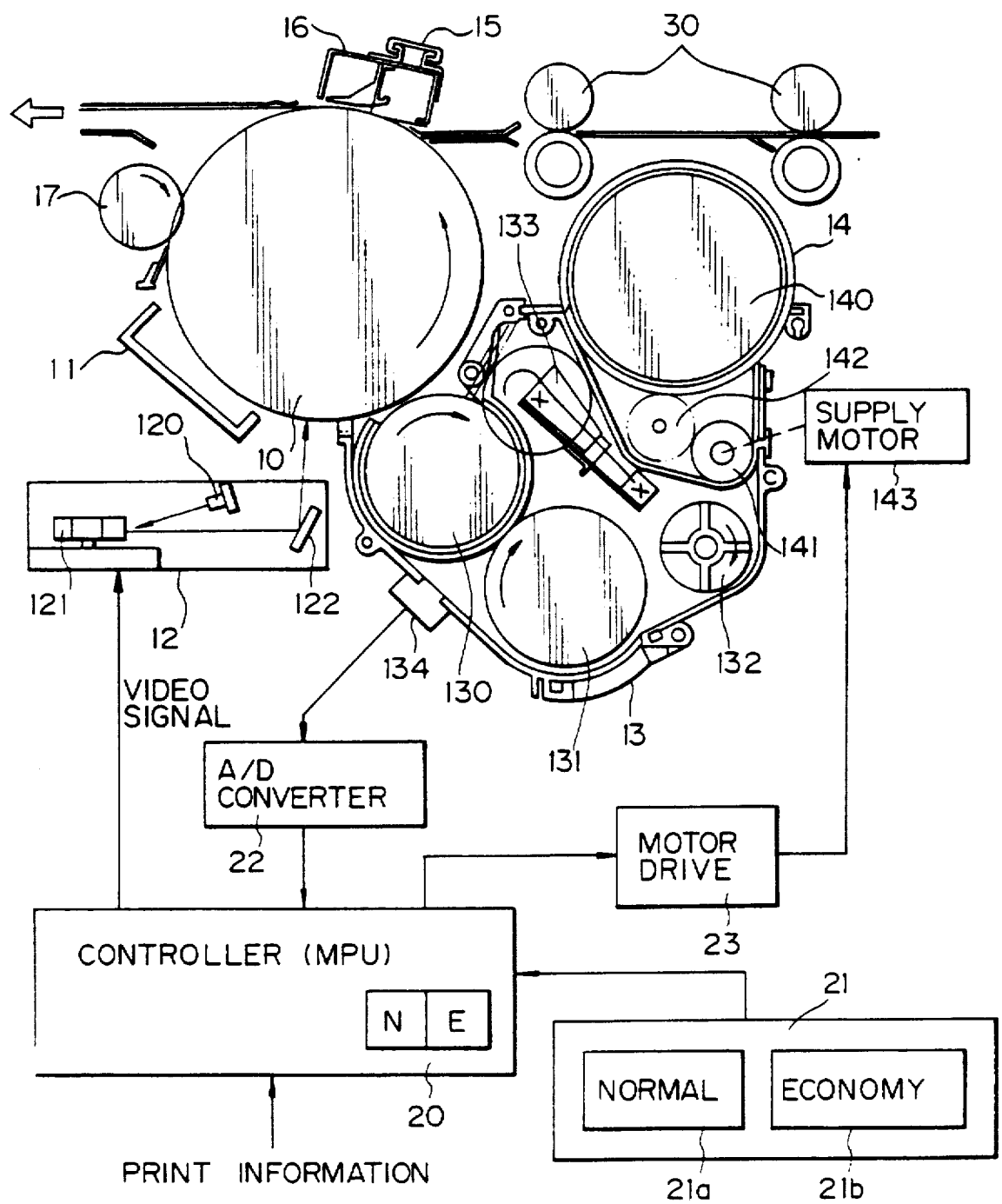
FIG. 2 is a block flow diagram of a first embodiment of this invention.

FIG. 2 is a block flow diagram of a first embodiment of this invention and shows an example of an electronic photograph printer.

In the figure, a print mechanism section 1 is structured with an electronic photograph print mechanism, and a developing device 13 having a charging device 11, a light image writing section 12 and a toner replenishing section 14 as well as a copier 15, an AC current eliminating device (separator) 16 and a cleaning section 17 are installed around a turning photo sensitive drum 10.

The light image writing section 12 includes a luminous source (semi-conductor laser) 120, a polygon mirror (light scanner) 121 for light-scanning the light of luminous source 120 and a mirror 122 for guiding the scanned light to a photo sensitive drum 10.

The developing device 13 comprises a magnetic roller 13 for supplying to the photo sensitive drum 10 the two-constituent developing agent consisting of toner and carrier, a supply roller 131 for supplying the two-constituent developing agent to the magnetic roller 13, an agitation roller 132 for agitating the carrier and the toner, a flow plate 133 for guiding the residual developing agent of a magnetic roller 130 to the agitation roller 132 and a toner density sensor (permeability sensor) 143 for detecting the permeability of a two-constituent developing agent and for generating the toner density detection output.

The toner replenishing section 14 comprises a toner accommodating section (toner cassette) storing the toner, a supply roller 141 for supplying the toner from the toner accommodating section 140 to a developing device 13, an agitation roller 142 for sending the toner the supply roller 141 and a supply roller 143 for turning the supply roller 141.

This electronic photograph print mechanism functions, as publicly known, to uniformly charge the photo sensitive drum 10 with the charging device 11, light-scan the light of luminous source 120 being driven by a video signal with the polygon mirror 121, line-expose the photo sensitive drum via a mirror 122, form an electrostatic latent image, develop the toner by the developing device 13, transfer the toner image on the photo sensitive drum 10 by a copier 15 onto the paper being fed by a transfer roller 30 and separate the paper from the photo sensitive drum 10 using the AC current eliminating device 16.

The residual toner on the photo sensitive drum 10 after transferring the image is removed by a cleaning brush and a blade of cleaning section 17, and the separated paper is sent to a fixer for the fixation of a toner image.

On the other hand, the print controlling section 2 comprises a control section (MPU) 20 that accommodates the designated toner density N in normal mode and the designated toner density E in economy mode, a control panel 21 including a normal mode key 21a and an economy mode designating key 21b, an A/D (Analogue/Digital) converter 22 for converting the detected voltage of toner density sensor 134 into a digital value and inputting it to the control section 20 and a motor driving circuit for driving a supply motor 143 by the instruction of control section 20.

This control section 20 controls the light image writing section 12 and the like and controls the toner density by the print information (inclusive of a video information) from a main control section, which is not shown in the figure.

This control section operates as follows: With the economy mode key 21b on the control panel being depressed, the control section 20 selects the designated toner density E (for example, 3 wt%) in economy mode and controls the toner density.

That is to say, the control section cyclically reads the detection voltage of the toner density sensor 134 via the A/D converter 22, compares it with the designated toner density E, turns the supply motor 143 for a certain period of time by the motor driving section 23 when the detected toner density by the detection voltage falls below the designated toner density E, and replenishes a fixed volume of toner by the rotation of the supply roller 141.

Thereby, the toner density is controlled to the designated toner density E, the print density becomes thin to a readable degree, and the toner can be saved when printing papers for a manuscript.

On the other hand, when the normal mode key 21a on the control panel 21 is depressed, the control section 20 selects the designated toner density N (for example, 6 wt%) in normal mode and controls the toner density.

In short, the control section 20 cyclically reads the detection voltage of the toner density sensor 134 via the A/C converter 22, compares it with the designated toner density N, turns the supply motor 143 for a certain period of time by the motor driving section 23 when the detected toner density detected by the detection voltage falls below the designated toner density N, and replenishes a fixed volume of toner by the rotation of supply roller 141.

Thereby, the toner density is controlled to the designated toner density E, the print density becomes thick enough for a print quality that is suitable for printing the documents to be submitted.

In this way, the print density is changed by changing the toner density in accordance with the normal/economy instructions, the printing is made at a print density sufficient for the print quality in the normal mode and the printing is performed at a print density that is readable in the economy mode in order to reduce the toner volume automatically.

Because this toner density is automatically set, the print density of a readable degree and the toner saving can be set with high efficiency, and the maximum toner saving can be achieved while maintaining the necessary print density.

Furthermore, because the print density can be realized by controlling the toner density, the consumption volume of print consumables can be reduced comparatively easily and effectively.

(b) Description of Second Embodiment

Figure 3:
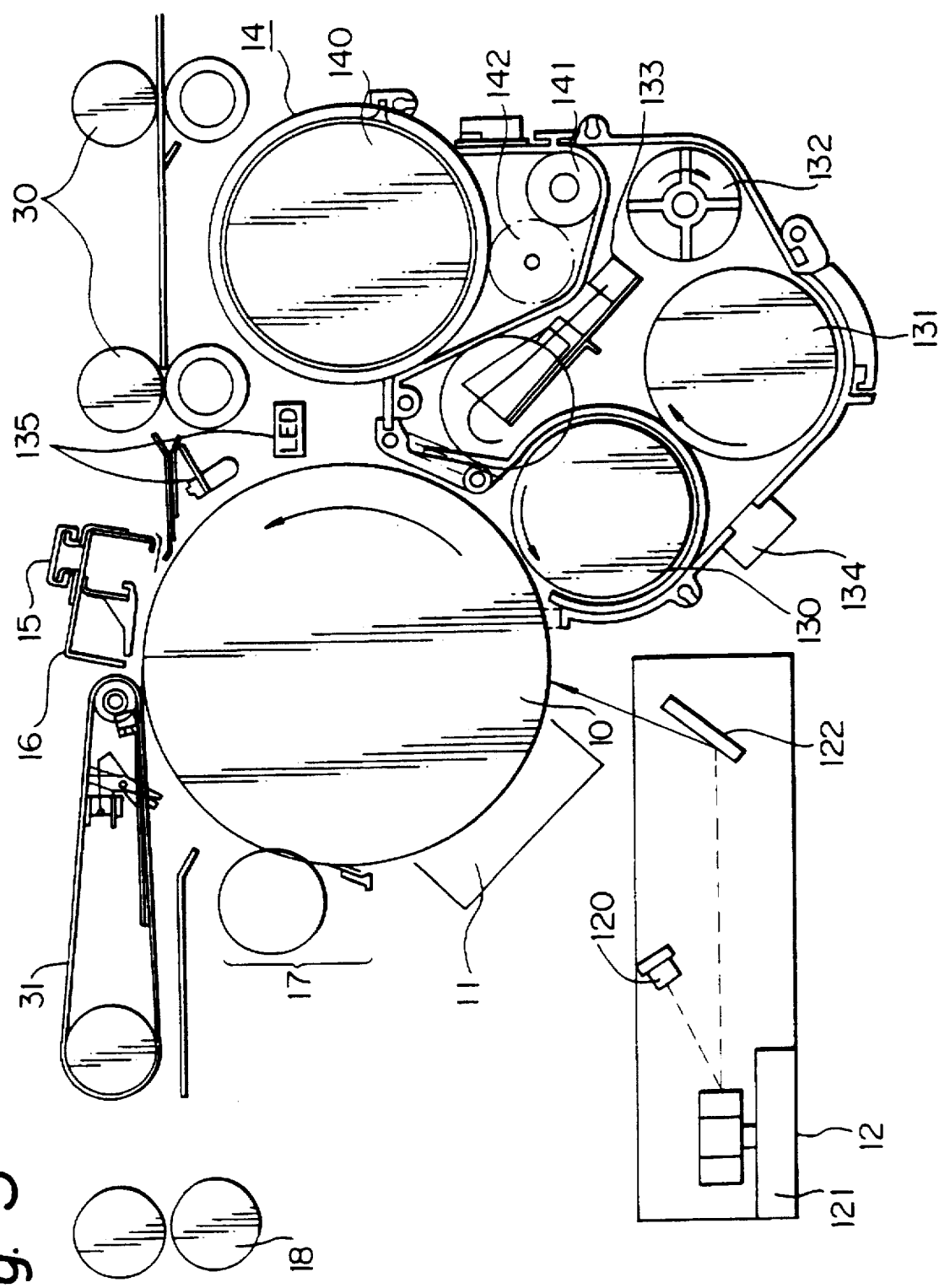
FIG. 3 is a block flow diagram of a second embodiment of this invention.
Figure 4A:
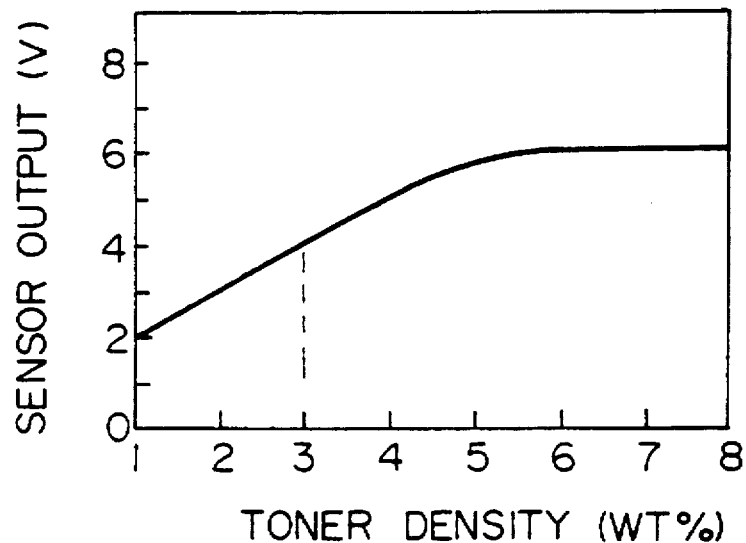
FIGS. 4(A) and 4(B) are characteristic diagrams of a toner density detector in a second embodiment of this invention.
Figure 4B:
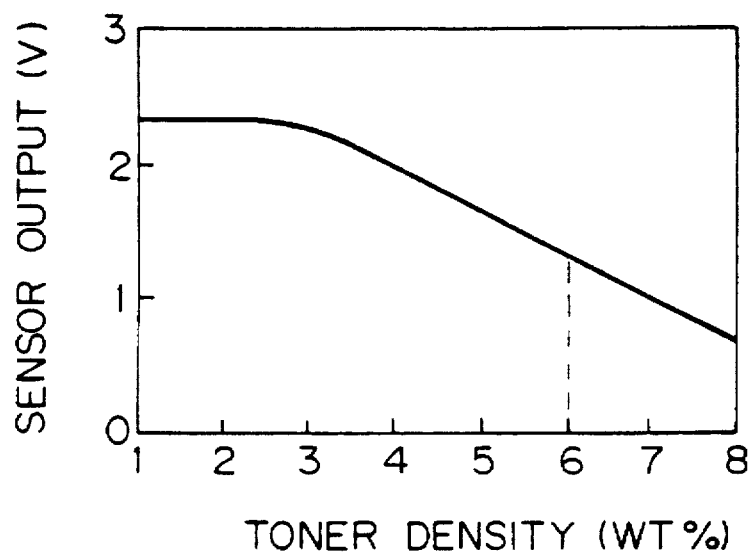
Figure 5:
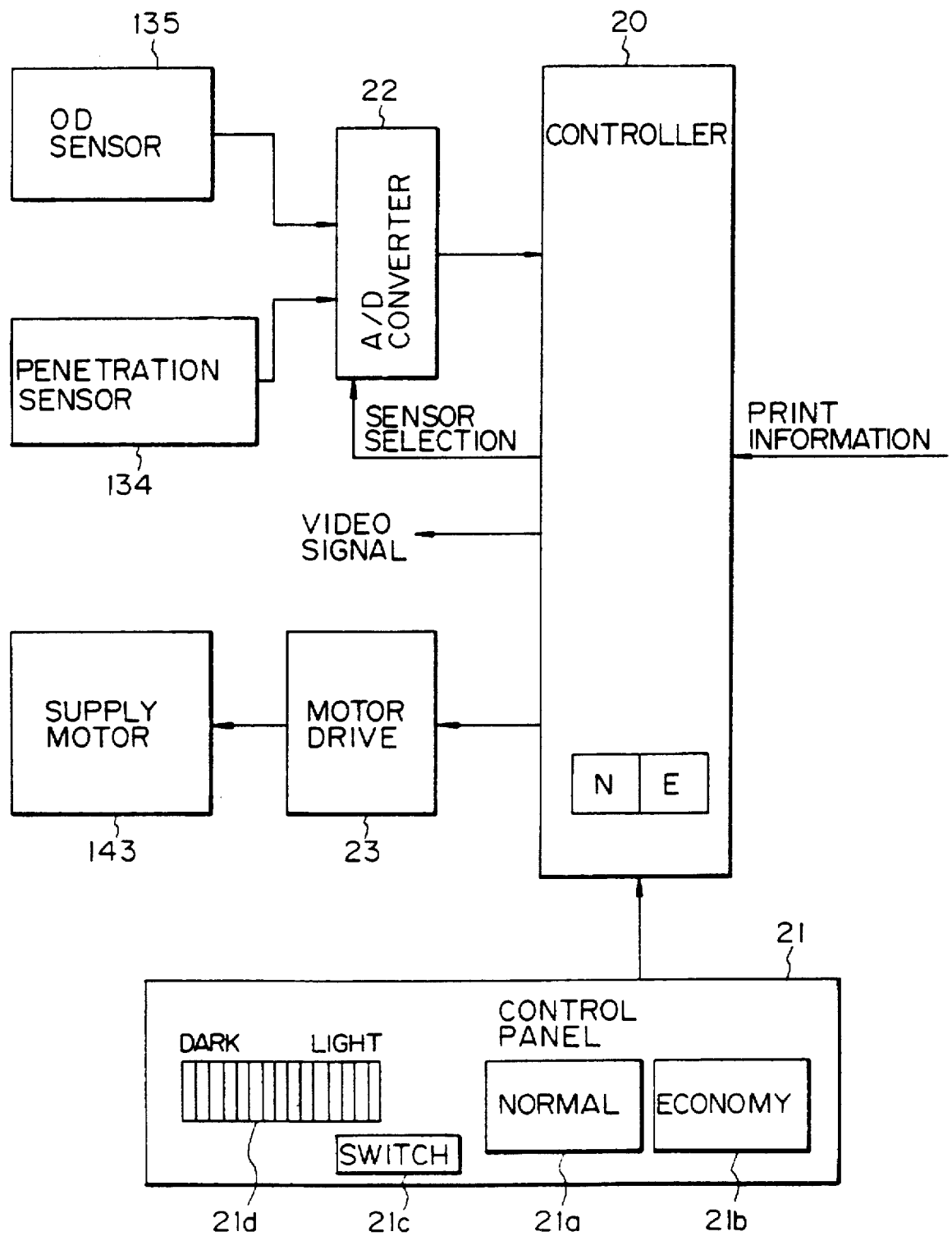
FIG. 5 is a block diagram of a second invention of this invention.

FIG. 3 is a block flow diagram of a second embodiment of a replenishing section, FIG. 4 is a characteristic diagram of a toner density detector in the second embodiment of this invention and FIG. 5 is a block diagram of the second embodiment of this invention.

The components identical to those shown in FIG. 2 have the same codes in FIG. 3 and FIG. 5, wherein Code 18 is a heat fixer that heat-fixes the toner image on the paper onto which the toner image is transferred and discharges the said paper, Code 31 is a transfer belt that promotes the separation of paper being separated by the AC current eliminating device 16 and feeds it to the heat fixer 18, and Code 135 is a toner density sensor that is structured of an OD (optical density) sensor and has a luminous section and a light receptacle section, and optically detects the toner mark on the photo sensitive drum 10 for detecting the toner density.

The reasons for installing this type of toner density sensors 134 and 135 are as stated below. As shown in FIG. 4(A), if the toner density exceeds the level of around 5 wt%, the toner density-to-sensor output of the OD sensor 135 is saturated and therefore the linear characteristic range is from 1 to 5 wt%. On the other hand, as shown in FIG. 4(B), if the toner density falls below the level of around 3 wt%, the toner density-to-sensor output of aforesaid permeability sensor 134 is saturated and therefore the linear characteristic range is from 3 to 8 wt%.

Therefore, for controlling the toner density in a wide range like the toner density at 6 wt % in the normal mode and the toner density at 3 wt % in the economy mode, the toner in economy mode cannot be controlled favorably only by the permeability sensor 134, and to the contrary, the toner in normal mode cannot be controlled favorably only by the OD sensor 135.

For this reason, 2 toner density sensors 134 and 135 different in linear characteristics are connected to the A/D converter 22 for selecting any of the detection outputs by the sensor selecting signal of control section 20 so that a wide range of toner density controls can be realized.

In addition to the normal mode key 21a and the economy mode key 21b, the present embodiment installs on the control panel 21 a density changing instruction switch 21c for adjusting and changing the print density during the normal mode in accordance with the operator's favorite, as well as a LED display section 21d of a bar display system for displaying the instructed density value.

FIG. 6 is a process flow chart of a second embodiment of this invention and FIG. 7 is an operational explanatory drawing of a second embodiment of this invention.

This embodiment operates as follows: With the economy mode key 21b on the control panel 21 being pressed down, the control section 20 elects the economy mode flag, while with the normal modekey 21a on the control panel 21 being pressed down, the control section 20 resets the economy mode flag.

(1) In the control routine of toner density in FIG. 6, the control section 20 determines if the mode is an economy mode or not by the flag.

(2) If the mode is the economy mode, the control section 20 selects the designated toner density E (for example, a slice value corresponding to 3wt %) of economy mode, instructs the output selection of the OD sensor 135 to the A/D converter 22, reads the detection voltage of the OD sensor 135 via the A/D converter 22, compares it with the slice value E of the designated toner density, and returns to Step (1) if the detected voltage is higher than the slice value E of the designated toner density.

(3) To the contrary, if the control section 20 determines that the detection voltage is lower than the slice value E of the designated toner density, it determines the toner density is thinner than the designated toner density, rotates the supply motor 143 for a certain period of time by the mode driving section 23, replenishes a fixed volume of toner by the rotation of supply roller 141 and returns to Step (1).

Thereby, the toner density is controlled to the designated toner density E, the print density becomes thinner to a readable degree, and toner can be saved when printing papers for a manuscript.

(4) On the other hand, in the normal mode, the control section 20 selects the designated toner density N (for example, the slice value corresponding to 6wt %) in normal mode, instructs the output selection of the permeability sensor 134 to the A/D converter 22, reads the detection voltage of permeability sensor 135 via the A/D converter 22, compares it with the slice value N of designated toner density and returns to Step (1) if the detection voltage is lower than the slice value N of the designated toner density.

(5) To the contrary, if the control section 20 determines that the detection voltage is higher than the slice value N of the designated toner density, it determines that the toner density is thinner than the designated toner density, rotates the supply motor 143 for a certain period of time by the motor driving section 23, replenishes a fixed volume of toner by the rotation of the supply roller 141 and returns to Step (1).

Thereby, the toner density is controlled to the designated toner density E, and the print density becomes sufficiently thick for a print quality that is suitable for the documents to be submitted.

In this way, the print density is changed by changing the toner density according to the normal/economy instructions as shown in FIG. 7, and in the normal mode the printing is made at a print density sufficient for the print quality, while in the economy mode the printing is made at a print density of a readable degree, thus automatically executing the toner saving.

At this time, if the economy mode is switched over to the normal mode, printing is prevented from being executed until the toner density inside the developing device 13 reaches the designated density of 6 wt% in normal mode by the replenishment of toner.

On the other hand, when the normal mode is switched over to the economy mode, the toner density inside the developing device 13 needs to be lowered to 3 wt% from 6 wt%.

As methods for lowering the toner density, there are such methods as lowering the density to 3 wt% by continuing the printing at the original toner density even after the switch-over to the economy mode and the method of starting the printing when the toner density has reached the designated density in economy mode by conducting the charging, exposure, development and cleaning, adhering the toner onto the photo sensitive drum 10, collecting the toner by cleaning, and discarding the toner.

In the former method, the printing is made initially at a density thicker than the designated density in economy mode even after the switch-over to the economy mode though there is no wasted toner, while in the latter method the printing can be made at the designated density in economy mode from the beginning though the toner is wasted.

Further, by using both the OD sensor 135 and the permeability sensor 134, a wide range of toner density control in this way can be realized in a favorable manner.

FIG. 7(B) shows the result of an experiment conducted by structuring the photo sensitive drum 10 with an amorphous silicone, structuring the carrier of a two-constituent developing agent with a magnetite system carrier and the toner with a polyester system toner with the periphery speed of the photo sensitive drum 10 set to 264 mm/sec; the magnetic roller 130 of the developing device 13 set to its diameter of 50 mm and its periphery speed of 250 rpm; the gap of doctor blade set to 1.2 mm, the development gap to 1.0 mm, the developing section charging potential of photo sensitive drum 10 to 430 V, and the development bias voltage to 240 V.

When the designated toner density in normal mode has been set to 6 wt% in this case, the full density proved to be higher than 1.25 with the line density being higher than 1.30 and the toner consumption volume being 340 g per 10,000 pages.

On the other hand, when the designated toner density in economy mode has been set to 3 wt %, the full density proves to be 1.00 to 1.10 with the line density being higher than 1.20, and the characters could be deciphered to a sufficient extent.

And the toner consumption volume proved to be 240 g per 10,000 pages.

As a result, it was confirmed that the toner can be saved by about 30% in the economy mode, and operating costs can be reduced.

(c) Description of Third Embodiment

Figure 8:
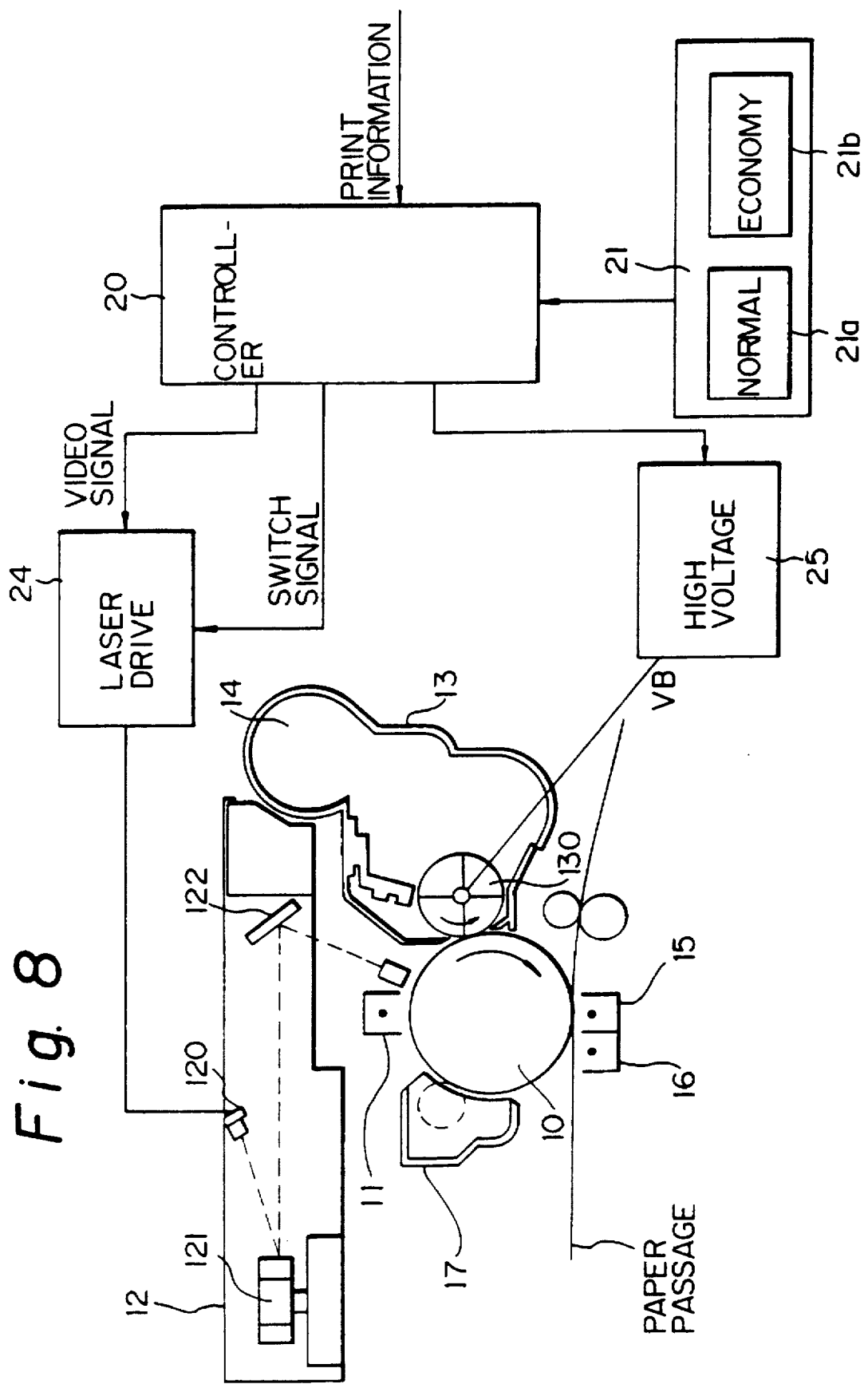
FIG. 8 is a block flow diagram of a third embodiment of this invention.
Figure 9A:
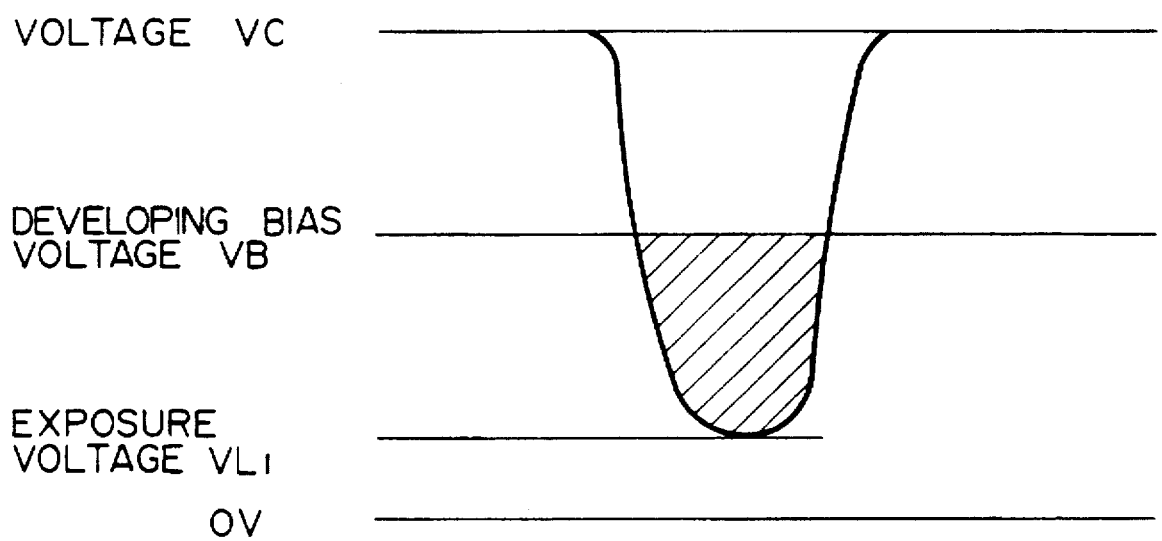
FIGS. 9(A) and (B) are operation explanatory drawings of a third embodiment of this invention.

FIG. 8 is a block flow diagram of a third embodiment of this invention and FIG. 9 is an operational explanatory drawing of a third embodiment of this invention.

The components shown in FIG. 2 have the same codes as those in FIG. 8, wherein Code 24 is a laser driving circuit that drives a laser luminous source 120 according to the video signal at the current corresponding to the designated intensity and Code 25 is a high voltage power source that impresses a development bias voltage VB to the magnetic roller 130 of developing device 13.

Its operation is explained with reference to FIG. 9 as follows: When the normal mode is designated by the normal mode key 21a, the control section 20 switches the drive current of laser driving circuit 24 over to a large current.

Thereby, the laser luminous source 120 emits the light according to the video signal at a large current, the luminosity intensity becomes greater, the potential at the exposure section is lowered as shown by VL1 and its difference (VB−VL1) from the development bias voltage VB becomes greater.

Because the toner proportionate to this differential voltage moves from the developing device 13, the print density becomes sufficiently thick for a print quality, that is suitable for the documents to be submitted.

The laser luminous source 120 changes the given current value at this time according to the density instruction information designated by a density instruction switch (FIG. 5).

Therefore, the print density is changed within a range suitable for printing the documents to be submitted.

In addition, the charge voltage may be changed in accordance with this density instruction information.

To the contrary, if the economy mode is designated by the economy mode key 21b, the control section 20 switches the drive current of laser driving circuit 24 over to a small current.

Figure 9B:
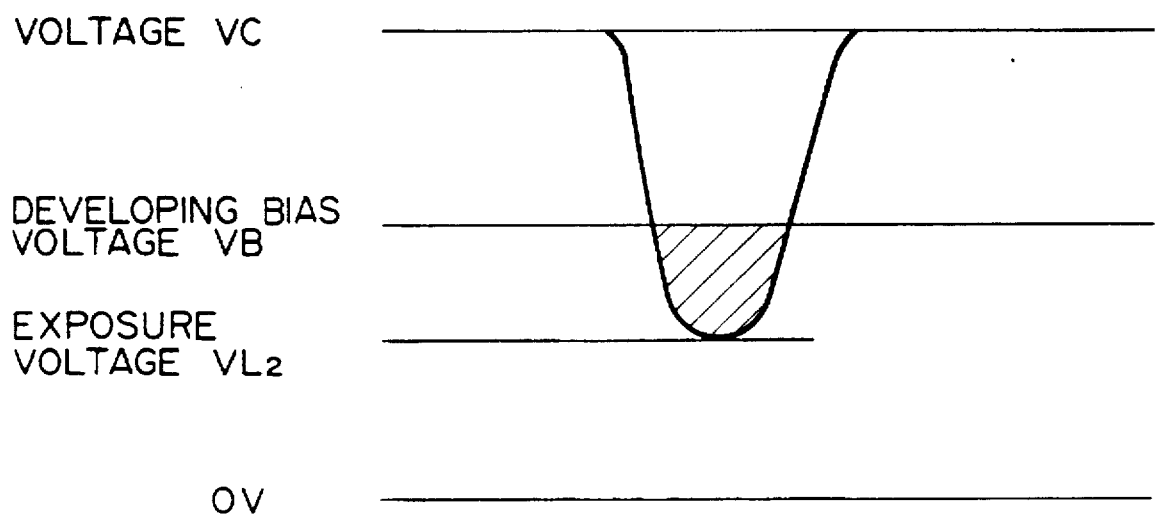

Thereby, the laser luminous source 120 emits light according to the video signal at a small current, the luminosity intensity becomes smaller, the potential of exposure section becomes high as shown by VL2 and the difference (VB−VL1) from the development bias voltage VB becomes smaller as shown in FIG. 9(B).

Because the toner proportionate to this differential voltage moves from the developing device 13, the print density becomes thinner, and toner can be saved when printing papers for a manuscript.

In this way, the developing density can be controlled to a thick or thin density by changing the difference between the development bias voltage VB and the potential VL of exposure section, and the toner consumption volume can be reduced.

This embodiment shows the two-component developing agent, but can also be applied to a one-component developing agent.

(d) Description of Fourth Embodiment

FIG. 10 is a block flow diagram of a fourth embodiment of this invention, and FIG. 11 is an operational explanatory drawing of a fourth embodiment of this invention.

The components shown in FIG. 2 have the same codes as those in FIG. 10, wherein Code 24 is a laser driving circuit that drives the laser luminous source 120 according to the video signal at a current corresponding to the designated intensity, and Code 25 is a high voltage power source that impresses the development bias voltages VB1 and VB2 designated to the magnetic roller 130 of the developing device 13.

The operation of this embodiment is explained with reference to FIG. 11 as follows: When the normal mode is designated by the normal mode key 21a, the control section 20 switches the development bias voltage of high voltage power source 25 over to a large voltage VB1.

Figure 11A:
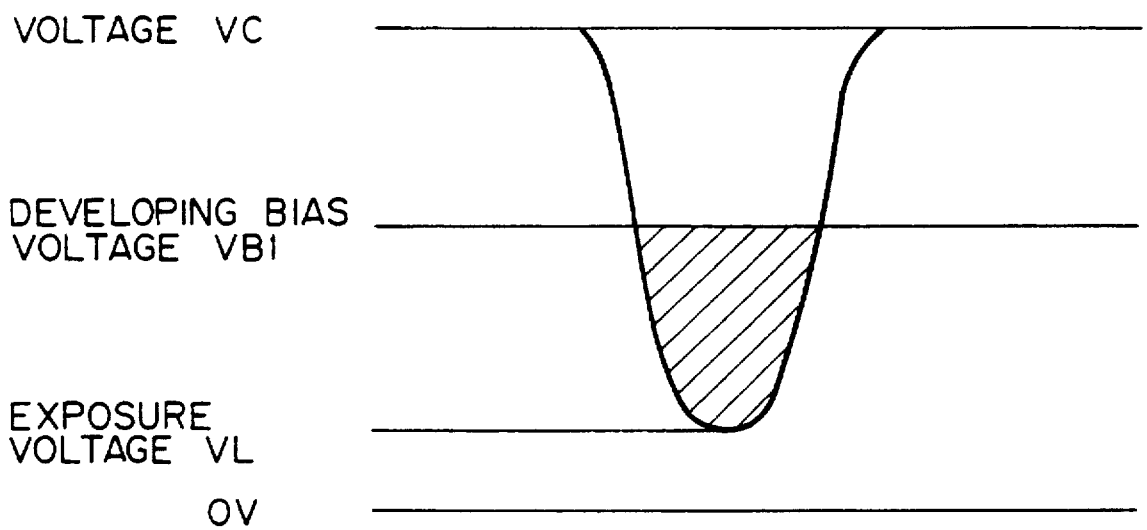
FIGS. 11(A) and (B) are operation explanatory drawings of a fourth embodiment of this invention.

Thereby, the developing device 13 develops the image at the large development bias voltage VB1, and the difference (VB1−VL) between the exposure section potential VL and the development bias voltage VB1 becomes larger as shown in FIG. 11(A).

Because the toner proportionate to this differential voltage moves from the developing device 13, the print density becomes sufficiently thick for a print quality that is suitable for printing the documents to be submitted.

To the contrary, if the economy mode is designated by the economy mode key 21b, the control section 20 switches the development bias voltage of a high voltage power source over to a small VB2.

Figure 11B:
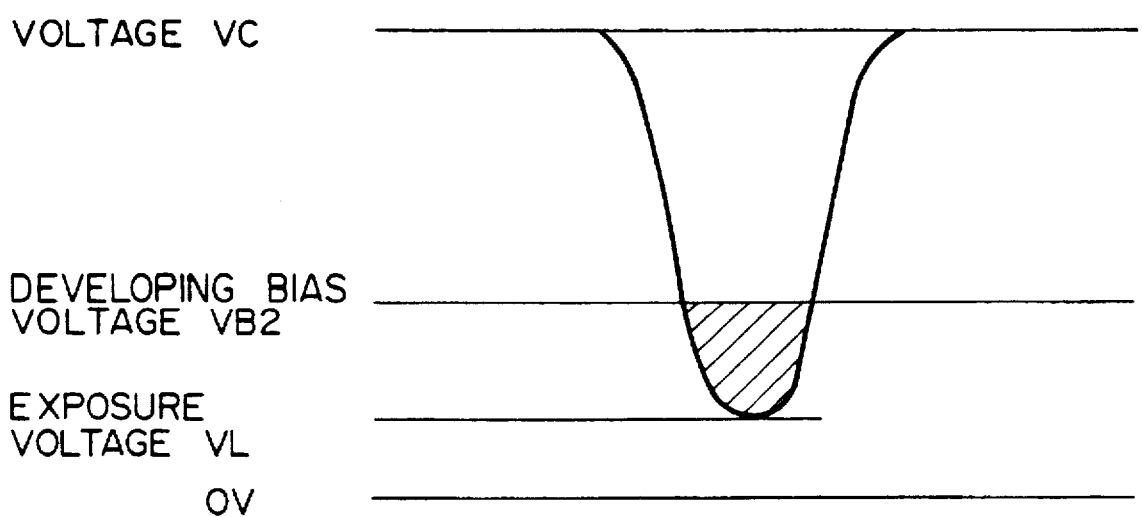

Thereby, the developing device 13 develops the image with a small development bias voltage VB2, and the difference (VB2−VL) between the exposure section potential VL and the development bias voltage VB2 becomes smaller as shown in FIG. 11(B).

Because the toner proportionate to this differential voltage moves from the developing device 13, the print density becomes thinner, and the toner can be saved when printing papers for a manuscript.

In this way, the developing density can be controlled to a thick or thin density by changing the difference between the development bias voltage VB and the exposure section potential VL, and the toner consumption volume can be reduced.

This embodiment indicates a two-component developing agent, but can also be applied to a one-component developing agent.

(e) Description of Fifth Embodiment

Figure 12:
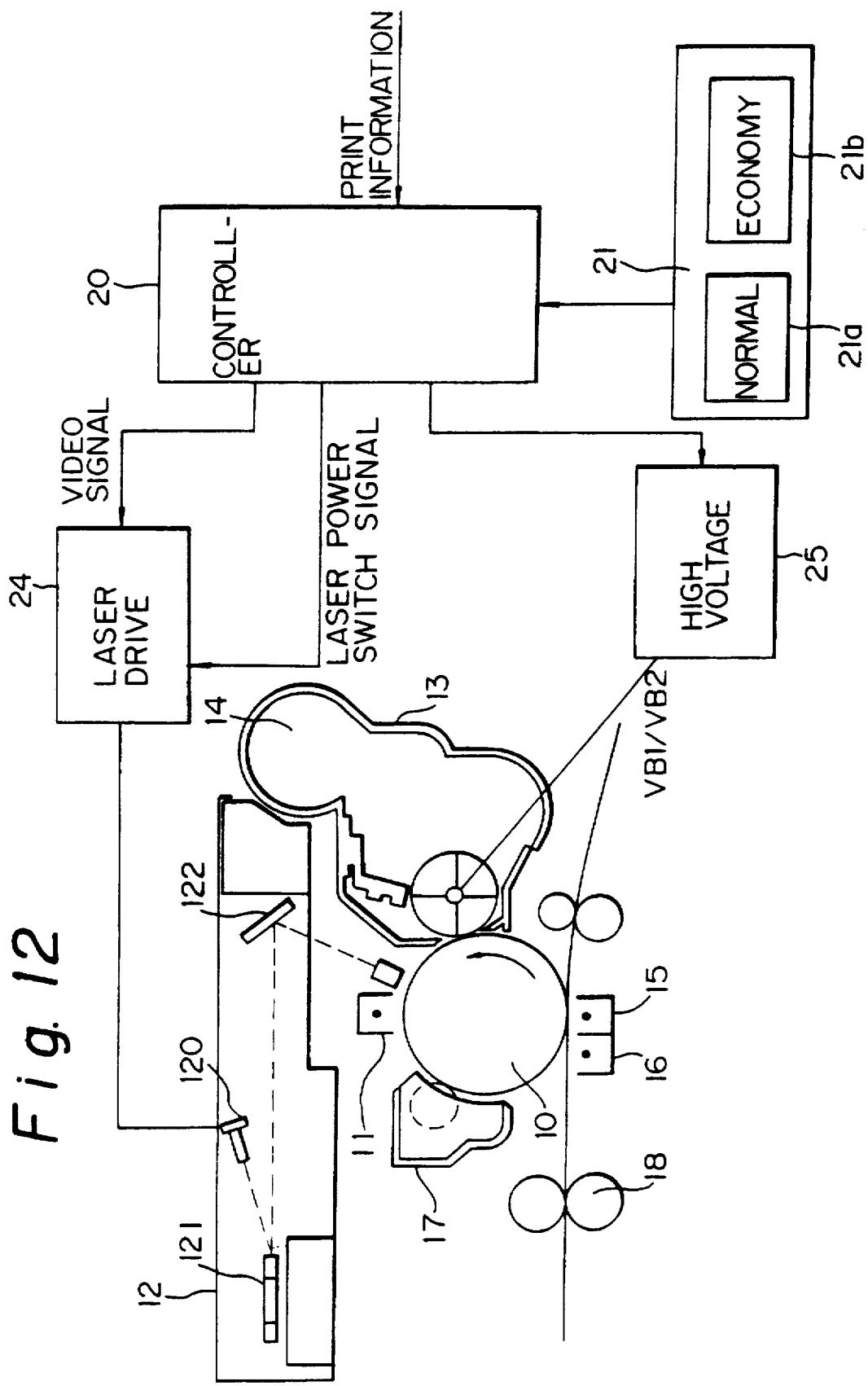
FIG. 12 is a block flow diagram of a fifth embodiment of this invention.

FIG. 12 is a block flow diagram of a fifth embodiment of this invention, and FIG. 13 is an operational explanatory drawing of the fifth embodiment of this invention.

The components shown in FIG. 2 have the same codes in FIG. 12, wherein Code 24 is a laser driving circuit that drives the laser luminous source 120 according to the video signal at a current corresponding to the designated intensity, and Code 25 is a high voltage power source that impresses the development bias voltages VB1 and VB2 designated to the magnetic roller 130 of the developing device 13.

The operation of this embodiment is explained with reference to FIG. 13 as follows: If the normal mode is designated by the normal mode key 21a, the control section 20 switches the drive current of the laser driving circuit 24 over to a large current and switches the development bias voltage of high voltage power source 25 over to a large current VB1.

Figure 13A:
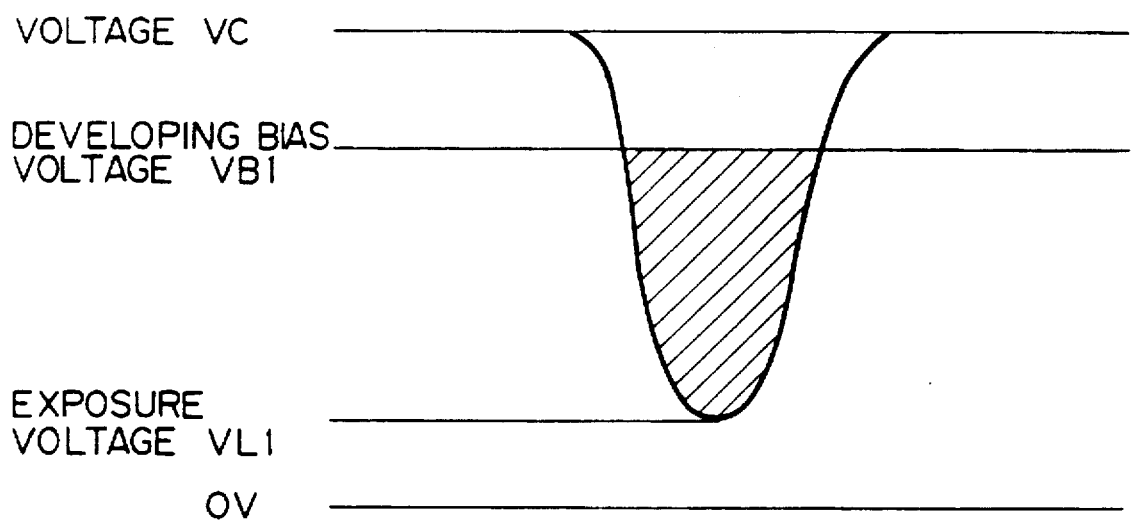
FIG. 13(A–B) is an operation explanatory drawing of a fifth embodiment of this invention.

Thereby, the laser luminous source 120 emits light according to the video signal at a large current with its luminous intensity becoming greater, and the potential of the exposure section becomes lower like the VL1 as shown in FIG. 13(A), while the developing device 13 develops the image at the large development bias voltage VB1, and the difference (VB1−VL1) between the potential VL1 of the exposure section and the development bias voltage VB1 becomes greater.

Because the toner proportionate to this differential voltage moves from the developing device 13, the print density becomes sufficiently thick for a print quality, that is suitable for printing the documents to be submitted.

To the contrary, if the economy mode is designated by the economy mode key 21b, the control section 20 switches the drive current of the laser driving circuit 24 over to a small current and switches the development bias voltage of high voltage power source 25 over to a small current VB2.

Figure 13B:
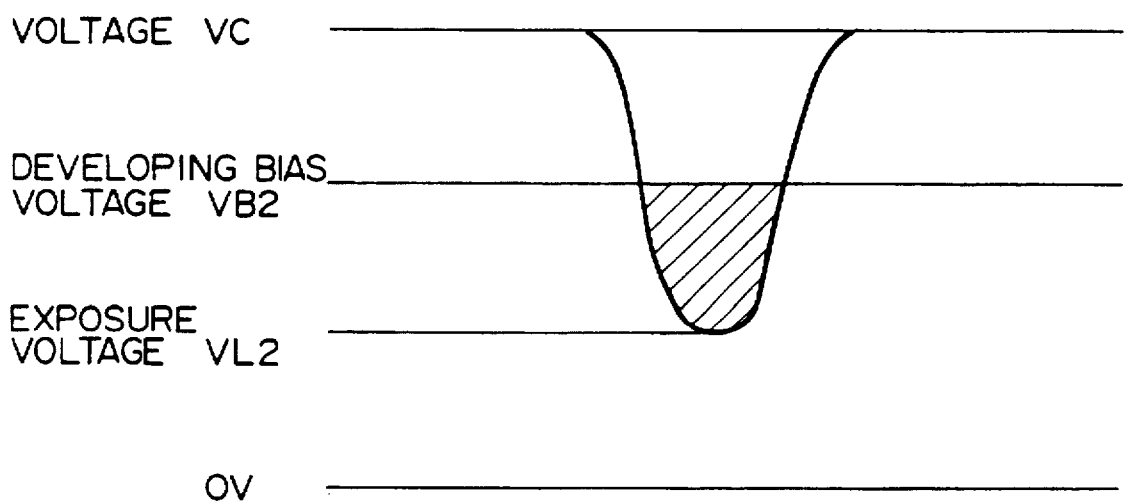

Thereby, the laser luminous source 120 emits light according to the video signal at a small current with the luminous intensity becoming small, and the potential of the exposure section becomes higher, like the VL2 as shown in FIG. 13(B), while the developing device 13 develops the image at a small development bias voltage VB2 and the difference (VB2−VL2) between the potential VL2 of the exposure section and the development bias voltage VB2 becomes smaller.

Because the toner proportionate to this differential voltage moves from the developing device 13, the print density becomes thinner, and toner can be saved when printing papers for a manuscript.

In this way the developing density can be controlled to a thick or thin density by changing the difference between the development bias voltage VB and the potential VL of the exposure section, and the toner consumption volume can be reduced.

This embodiment indicates a two-component developing agent, but can also be applied to a one-component developing agent.

In addition, since the print density is controlled both by the exposure intensity and the development bias voltage, the designated print density can be easily set.

(f) Description of Other Embodiments

In addition to the aforementioned embodiments, the present invention also covers the transformations as cited below:

(1) The printer has been described by using an electronic photograph printer, but in a heat transfer printer the heat transfer ink of a heat transfer ribbon can be Saved by changing the heating current, while in an ink jet printer the ink can be saved by controlling the ink jet volume and in an impact printer the service life of the ink ribbon can be elongated.

(2) Mention has be made of a printer, but this invention can also be applied to such printers as a copier, a facsimile and so forth.

(3) A variety of such combinations may be applied as necessary, such as the combination of toner density control with exposure intensity control, and the combination of toner density control with development bias voltage control.

(4) The normal/economy instructions are provided from the control panel in the said embodiments, but may also be given from a host computer, etc.

As described in the above, the following effects can be proposed according to the present invention.

(1) Because the print density of a print mechanism section is classified into sufficient print quality and readable degree print quality according to the normal/economy instructions, the consumption volume of print consumables can be automatically reduced thereby contributing to the reduction in operating costs with a subsequent lower consumption volume of toner and ink including harmful substances, and environmental pollution when the printer is broken is lessened.

(2) Because the print density can be controlled to an adequate readable print density, the operator's participation becomes unnecessary.

The present invention has been described with reference to some preferred embodiments in the above, but various transformations are available within the scope of the purport of this invention, which should not be excluded from the scope of this invention.

We claim:

1. An image forming apparatus connected to a host computer issuing a normal mode instruction and an economy mode instruction to the image forming apparatus, comprising:

an image forming mechanism for forming an image by applying toner particles onto a medium; and a print controller responsive to the normal mode instruction and the economy mode instruction issued from the host computer, said print controller controlling a toner consumption level at a first level in forming the image by said image forming mechanism when the normal mode instruction is received and controlling the toner consuming level at a second level lower than the first level when the economy mode instruction is received.

2. An image forming apparatus according to claim 1, wherein the toner consumption level is a toner density level.

3. An image forming apparatus comprising:

an image forming mechanism for forming an image by applying toner particles onto a medium;

input means for inputting a normal mode instruction and an economy mode instruction; and a print controller responsive to the normal mode instruction and the economy mode instruction input from the input means, said print controller controlling a toner consumption level at a first level in forming the image by said image forming mechanism when the normal mode instruction is received and controlling the toner consumption level at a second level lower than the first level when the economy mode instruction is received.

4. An image forming apparatus according to claim 3, wherein the toner consuming level is a toner density level.

5. An image forming apparatus according to claim 3, wherein said input means is a switch provided on an operational panel of the image forming apparatus.

6. An image forming apparatus according to claim 5, wherein the operation panel comprises a toner density selection switch.

7. An image forming apparatus connected to a host computer issuing a normal mode instruction and an economy mode instruction to the image forming apparatus, comprising:

an image forming mechanism for forming an image by applying toner particles onto a medium; and means for receiving from the host computer print information to be formed as an image by said image forming mechanism;

a print controller responsive to the normal mode instruction and the economy mode instruction issued from the host computer, said print controller controlling a toner consumption amount for the image to be formed at a first level in forming the image by said image forming mechanism when the normal mode instruction is received and controlling the toner consumption amount for the image to be formed at a second level lower than the first level when the economy mode instruction is received.

8. An image forming apparatus comprising:

an image forming mechanism for forming an image by applying toner particles onto a medium;

input means for inputting a normal mode instruction and an economy mode instruction; and means for receiving from a host computer print information to be formed as an image by said image forming mechanism;

a print controller responsive to the normal mode instruction and the economy mode instruction input from the input means, said print controller controlling a toner consumption amount for the image to be formed at a first level in forming the image by said image forming mechanism when the normal mode instruction is received and controlling the toner consumption amount for the image to be formed at a second level lower than the first level when the economy mode instruction is received.

9. An image forming apparatus according to claim 8, wherein said input means is a switch provided on an operational panel of the image forming apparatus.

10. An image forming apparatus according to claim 9, wherein the operational panel comprises a toner density selection switch.

* * * * *

UNITED STATES PATENT AND TRADEMARK OFFICE
CERTIFICATE OF CORRECTION

PATENT NO. : 5,546,170
DATED : August 13, 1996
INVENTOR(S) : Hiroki OHBA et al.

It is certified that error appears in the above-indentified patent and that said Letters Patent is hereby corrected as shown below:

Title Page, first column, Section [75] Inventors:
    line 1, delete "Fuchu" and substitute --Tokyo--;
Title Page, second column, under OTHER PUBLICATIONS,
    lines 1-2, delete "HighPrint 6002-Operating Instructions" and substitute --"HighPrint 6002-Operating Instructions"--.

Column 2, line 6, delete "these" and substitute --there--.

Column 3, line 39, after "for", delete dash.

Column 4, line 42, delete "FIG. 13(A-B)" and substitute --FIGS. 13(A) and 13(B)--.

Column 6, line 59, delete "6 wt %" and substitute --6 wt%--;
    line 60, delete "3 wt %" and substitute --3 wt%--.

Column 7, line 24, delete "3 wt %" and substitute --3 wt%--;
    line 44, delete "6 wt %" and substitute --6 wt%--.

Column 8, line 48, delete "3 wt %" and substitute --3 wt%--.

UNITED STATES PATENT AND TRADEMARK OFFICE
CERTIFICATE OF CORRECTION

PATENT NO. : 5,546,170
DATED : August 13, 1996
INVENTOR(S) : Hiroki OHBA et al.

It is certified that error appears in the above-indentified patent and that said Letters Patent is hereby corrected as shown below:

Column 11, line 26, delete "be" and substitute --been--.

Signed and Sealed this

Twenty-first Day of January, 1997

Attest:

BRUCE LEHMAN

*Attesting Officer*  *Commissioner of Patents and Trademarks*